United States Patent
Appukutty et al.

(10) Patent No.: US 11,748,386 B2
(45) Date of Patent: *Sep. 5, 2023

(54) METHOD, SYSTEM, AND COMPUTER PROGRAM PRODUCT FOR MANAGING SOURCE IDENTIFIERS OF CLUSTERED RECORDS

(71) Applicant: Visa International Service Association, San Francisco, CA (US)

(72) Inventors: Sathis kumar Appukutty, San Mateo, CA (US); Sukalyan Chakraborty, Foster City, CA (US); Abhijith Ramesh Kashyap, San Carlos, CA (US); Mahesh Joshi, Hillsborough, CA (US); Urjit Anand Khadilkar, Redwood City, CA (US); Prithwiraj Mitra, Foster City, CA (US); Nitin Singhal, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 17/470,512

(22) Filed: Sep. 9, 2021

(65) Prior Publication Data

US 2021/0406286 A1  Dec. 30, 2021

Related U.S. Application Data

(63) Continuation of application No. 16/516,751, filed on Jul. 19, 2019, now Pat. No. 11,138,238.

(Continued)

(51) Int. Cl.
*G06F 16/28* (2019.01)
*G06F 16/2458* (2019.01)
(Continued)

(52) U.S. Cl.
CPC ........ *G06F 16/285* (2019.01); *G06F 16/2358* (2019.01); *G06F 16/2457* (2019.01); *G06F 16/2468* (2019.01)

(58) Field of Classification Search
CPC ............ G06F 16/2468; G06F 16/2358; G06F 16/2457; G06F 16/285; G06F 21/50;
(Continued)

(56) References Cited

U.S. PATENT DOCUMENTS 9,202,249 B1 * 12/2015 Cohen .................. G06F 16/285
9,230,280 B1 *  1/2016 Maag ..................... G06Q 40/00
(Continued)

*Primary Examiner* — Evan Aspinwall
(74) *Attorney, Agent, or Firm* — THE WEBB LAW FIRM

(57) ABSTRACT

Provided is a method for managing source identifiers of clustered records, which may include receiving a plurality of records, each having identification data associated with a source thereof. The records may be sorted into a first plurality of clusters. A first source identifier may be generated for each cluster. Update data associated with an update to the records may be received. At least some of the records may be sorted into a second plurality of clusters. A first cluster of the second plurality of clusters may have first identification data different from at least one cluster of the first plurality of clusters, and a second cluster of the second plurality of clusters may have identification data that substantially matches the at least one cluster. Whether to assign the first source identifier to the first or second cluster may be determined. A system and computer program product are also disclosed.

15 Claims, 8 Drawing Sheets

Related U.S. Application Data

(60) Provisional application No. 62/700,933, filed on Jul. 20, 2018.

(51) Int. Cl.
*G06F 16/2457* (2019.01)
*G06F 16/23* (2019.01)

(58) Field of Classification Search
CPC ...... G06F 21/552; G06F 16/906; G06F 16/35; G06F 18/23; G06F 16/9038; G06F 16/355; H04L 63/1425; H04L 63/1408; H04L 63/1416; H04L 63/1433; G06Q 40/00; G06Q 40/02; G06Q 40/12; G06Q 20/4014; G06Q 20/4016; G06Q 20/40; G06Q 20/401; G06K 9/6218
USPC ............ 707/737, 735, 722, 728; 705/35, 38; 726/23
See application file for complete search history.

(56) References Cited

U.S. PATENT DOCUMENTS 9,367,872 B1 * 6/2016 Visbal ............... G06F 16/24578
9,454,785 B1 * 9/2016 Hunter .................. G06Q 40/00

\* cited by examiner

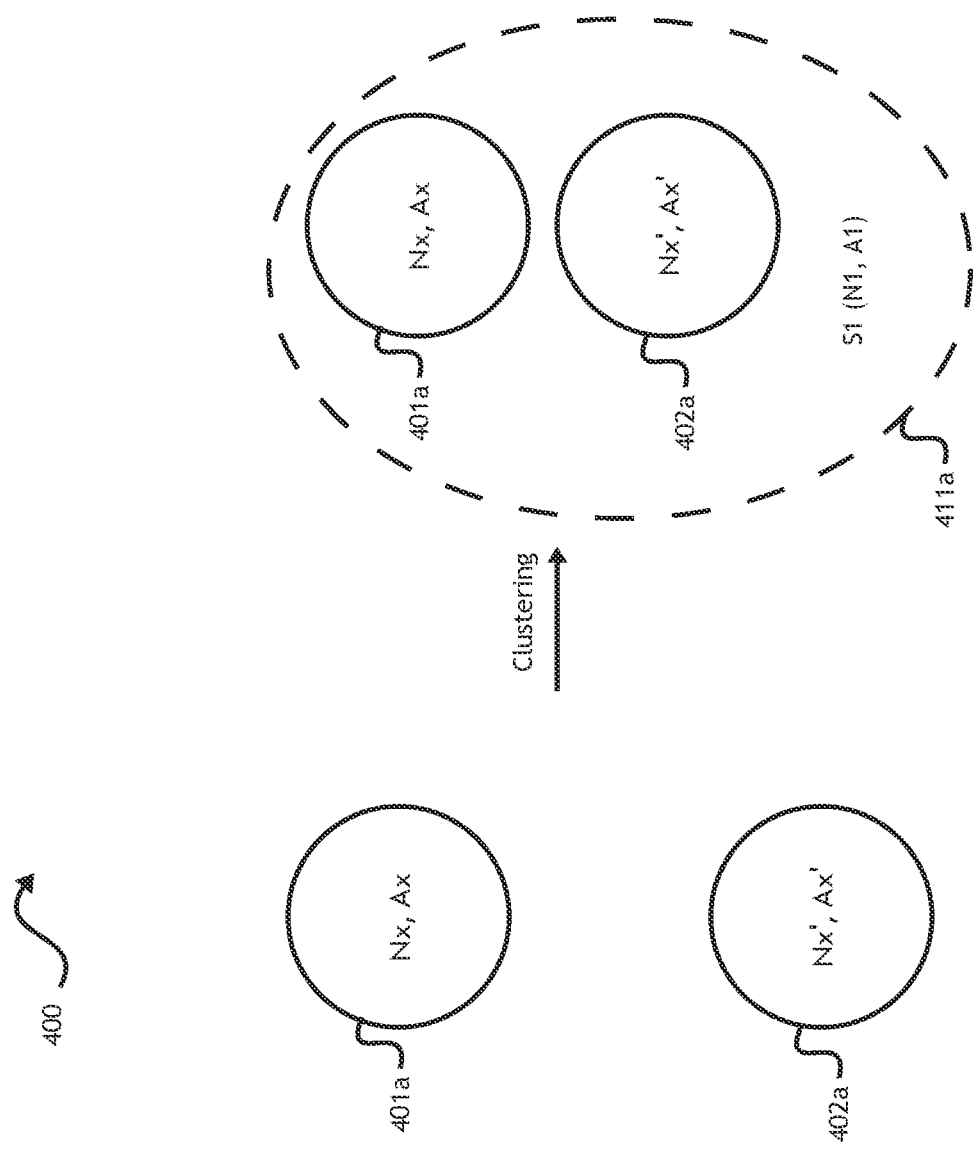

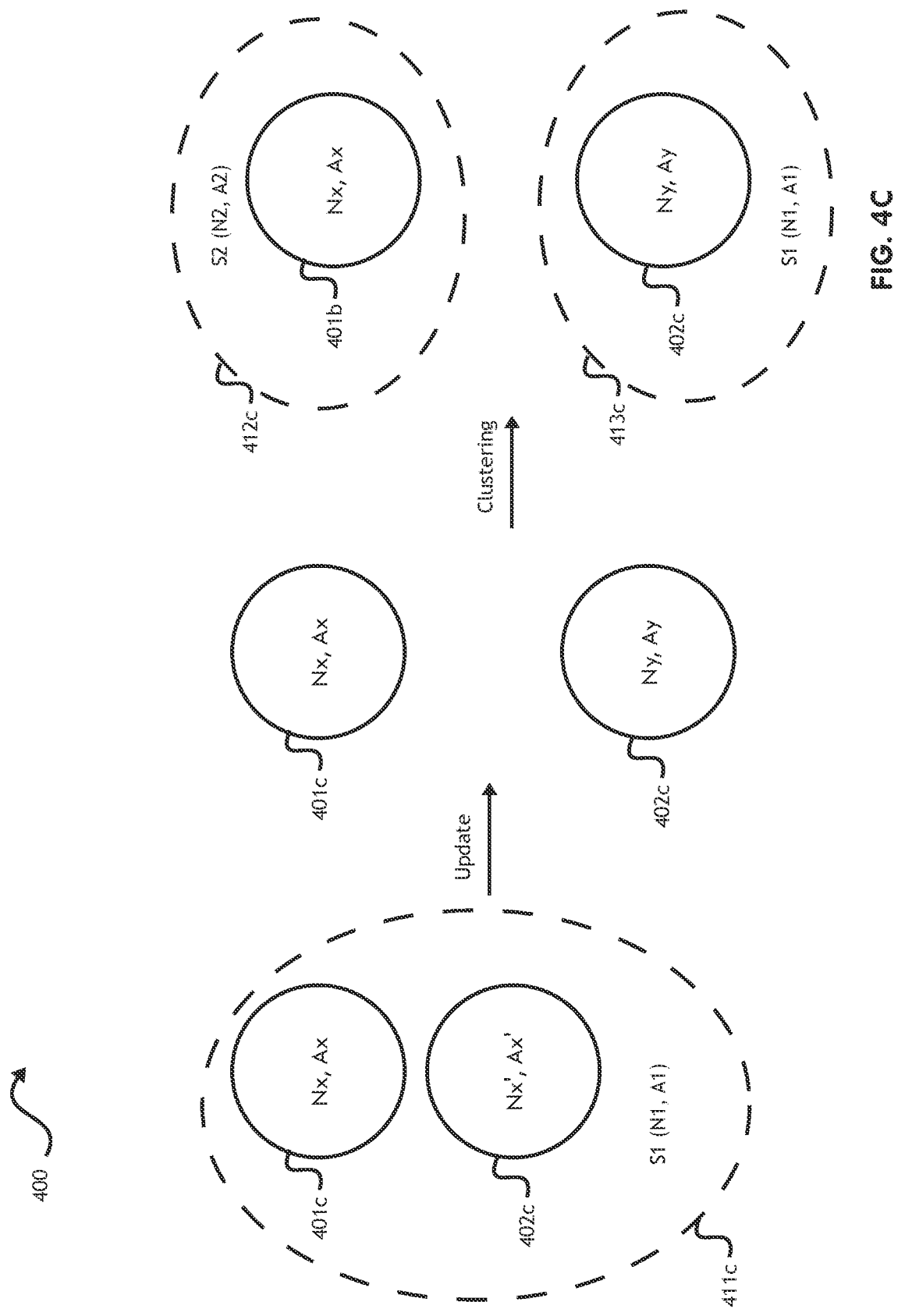

METHOD, SYSTEM, AND COMPUTER PROGRAM PRODUCT FOR MANAGING SOURCE IDENTIFIERS OF CLUSTERED RECORDS

CROSS-REFERENCE TO RELATED APPLICATIONS

This application is a continuation of U.S. patent application Ser. No. 16/516,751 filed Jul. 19, 2019, which claims the benefit and priority of U.S. Provisional Patent Application No. 62/700,933, filed Jul. 20, 2018, the disclosures of which are hereby incorporated by reference in their entireties.

BACKGROUND

1. Field of the Invention

This disclosed subject matter relates generally to methods, systems, and products for managing source identifiers of clustered records and, in some particular embodiments or aspects, to a method, system, and computer program product for managing source identifiers of clustered records based on attributes of the clusters.

2. Technical Considerations

Certain databases (e.g., transaction databases) may cluster records (e.g., transaction records) based on identifying information (e.g., name information, address information, and/or the like). For example, such clustering may be automatic, e.g., based on matching (e.g., fuzzy matching) and/or predefined or dynamic clustering rules. Some such databases may assign a cluster identifier to the cluster and/or a source identifier associated with a source of the records in the cluster (e.g., a source of the transactions, such as a merchant from which payment transactions originate).

In certain circumstances, at least a portion of the identifying information for at least some records may be modified. Additionally or alternatively, new records may be included (e.g., received, inputted, and/or the like) in the database, and at least some such new records may include new identifying information. For example, multiple sources (e.g., two merchants) may merge into a single source (e.g., a merchant) with new identifying information (e.g., different identifying information than records associated with existing clusters). Additionally or alternatively, a single source (e.g., a merchant) may split into multiple sources (e.g., two merchants), each with new identifying information. Additionally or alternatively, a source (e.g., merchant) may change name and/or location, which may result in a corresponding change to identifying information (e.g., name and/or address information). Additionally or alternatively, a source (e.g., merchant) may add a new device (e.g., terminal, such as transaction terminal) to its system, and the new device may have different (e.g., slightly different) identifying information (e.g., a name and/or address spelled and/or formatted slightly differently). Such records with modified and/or new identifying information may result in the creation of a new cluster. As a result, new identifiers (e.g., new cluster and/or source identifiers) may be assigned to the records in the new cluster. However, such new identifiers may be undesirable in some circumstances. For example, when the new records are from the same source (e.g., merchant) but the new identifying information misrepresents the source as being different, the source may have difficulty keeping track of and/or updating its systems to accommodate the new identifiers.

SUMMARY

Accordingly, provided are improved methods, systems, and computer program products for managing source identifiers of clustered records.

According to non-limiting embodiments or aspects, provided is a method for managing source identifiers of clustered records. In some non-limiting embodiments or aspects, a method for managing source identifiers of clustered records may include receiving a plurality of records. Each record of the plurality of records may include identification data associated with a source of the respective record. The plurality of records may be sorted into a first plurality of clusters based on the identification data. Each cluster of the first plurality of clusters may include at least one record of the plurality of records. A first source identifier for each cluster of the first plurality of clusters may be generated. Update data associated with an update to the plurality of records may be received. At least some of the plurality of records may be sorted into a second plurality of clusters based on the identification data and the update data. A first cluster of the second plurality of clusters may have first identification data different from the identification data associated with at least one cluster of the first plurality of clusters and a second cluster of the second plurality of clusters may have second identification data that substantially matches the at least one cluster of the first plurality of clusters. Whether to assign the first source identifier of the at least one cluster of the first plurality of clusters to the first cluster of the second plurality of clusters may be determined.

In some non-limiting embodiments or aspects, the update data may include at least one of a modification of the identification data of at least some records of the plurality of records or additional records to be added to the plurality of records. In some non-limiting embodiments or aspects, a second source identifier for the second cluster of the second plurality of clusters may be generated. In some non-limiting embodiments or aspects, determining whether to assign the first source identifier of the at least one cluster of the first plurality of clusters to the first cluster of the second plurality of clusters may include comparing at least one attribute of the first cluster of the second plurality of clusters to at least one corresponding attribute of the second cluster of the second plurality of clusters and determining whether to assign the first source identifier of the at least one cluster of the first plurality of clusters to one of the first cluster of the second plurality of clusters or the second cluster of the second plurality of clusters based on the comparison of the at least one attribute and the at least one corresponding attribute.

In some non-limiting embodiments or aspects, the attribute may include at least one of a total number of records in the first cluster of the second plurality of clusters, an aggregate of records of the at least one cluster of the first plurality of clusters that were sorted into the first cluster of the second plurality of clusters, an aggregate of records in a third cluster of the first plurality of clusters having identification data that substantially matches the first cluster of the second plurality of clusters, or an aggregate of records in the first cluster of the second plurality of clusters that are not associated with any cluster of the first plurality of clusters. Additionally or alternatively, the corresponding attribute may include at least one of a total number of records in the second cluster of the second plurality of clusters, an aggregate of records of the at least one cluster of the first plurality of clusters that were sorted into the second cluster of the second plurality of clusters, or an aggregate of records in the at least one cluster of the first plurality of clusters. In some non-limiting embodiments or aspects, the records may include payment transaction records. Additionally or alternatively, each payment transaction record may be one of transacting or non-transacting. Additionally or alternatively, the attribute may include at least one of a number of transacting records of the first cluster of the second plurality of clusters, a number of non-transacting records of the first cluster of the second plurality of clusters, or a total number of records of the first cluster of the second plurality of clusters. Additionally or alternatively, the corresponding attribute may include at least one of a number of transacting records of the second cluster of the second plurality of clusters, a number of non-transacting records of the second cluster of the second plurality of clusters, or a total number of records of the second cluster of the second plurality of clusters.

In some non-limiting embodiments or aspects, determining whether to assign the first source identifier of the at least one cluster of the first plurality of clusters to one of the first cluster of the second plurality of clusters or the second cluster of the second plurality of clusters may include, if a number of transacting records of the at least one cluster of the first plurality of clusters is 0, the number of non-transacting records of the first cluster of the second plurality of clusters is greater than 0, the number of transacting records of the first cluster of the second plurality of clusters is 0, and the number of non-transacting records of the second cluster of the second plurality of clusters is 0, assigning the first source identifier of the at least one cluster of the first plurality of clusters to the first cluster of the second plurality of clusters. In some non-limiting embodiments or aspects, determining whether to assign the first source identifier of the at least one cluster of the first plurality of clusters to one of the first cluster of the second plurality of clusters or the second cluster of the second plurality of clusters may include, if a number of transacting records and a number of non-transacting records of the at least one cluster of the first plurality of clusters is greater than 0, and the number of transacting records and the number of non-transacting records of the second cluster of the second plurality of clusters is greater than zero, assigning the first source identifier of the at least one cluster of the first plurality of clusters to the second cluster of the second plurality of clusters; if the number of transacting records and the number of non-transacting records of the at least one cluster of the first plurality of clusters is greater than 0, the number of transacting records of the first cluster of the second plurality of clusters is 0, and the number of non-transacting records of the first cluster of the second plurality of clusters is greater than 0, assigning the first source identifier of the at least one cluster of the first plurality of clusters to the second cluster of the second plurality of clusters; if a number of transacting records of a third cluster of the first plurality of clusters is greater than 0 and the identification data of the first cluster of the second plurality of clusters substantially matches the third cluster of the first plurality of clusters, assigning the first source identifier of the at least one cluster of the first plurality of clusters to the second cluster of the second plurality of clusters.

According to another non-limiting embodiment, provided is a system for managing source identifiers of clustered records. In some non-limiting embodiments or aspects, a system for managing source identifiers of clustered records may include at least one processor and at least one non-transitory computer-readable medium comprising instructions to direct the at least one processor to receive a plurality of records. Each record of the plurality of records may include identification data associated with a source of the respective record. The plurality of records may be sorted into a first plurality of clusters based on the identification data. Each cluster of the first plurality of clusters may include at least one record of the plurality of records. A first source identifier for each cluster of the first plurality of clusters may be generated. Update data associated with an update to the plurality of records may be received. At least some of the plurality of records may be sorted into a second plurality of clusters based on the identification data and the update data. A first cluster of the second plurality of clusters may have first identification data different from the identification data associated with at least one cluster of the first plurality of clusters and a second cluster of the second plurality of clusters may have second identification data that substantially matches the at least one cluster of the first plurality of clusters. Whether to assign the first source identifier of the at least one cluster of the first plurality of clusters to the first cluster of the second plurality of clusters may be determined.

In some non-limiting embodiments or aspects, the update data may include at least one of a modification of the identification data of at least some records of the plurality of records or additional records to be added to the plurality of records. In some non-limiting embodiments or aspects, a second source identifier for the second cluster of the second plurality of clusters may be generated. In some non-limiting embodiments or aspects, determining whether to assign the first source identifier of the at least one cluster of the first plurality of clusters to the first cluster of the second plurality of clusters may include comparing at least one attribute of the first cluster of the second plurality of clusters to at least one corresponding attribute of the second cluster of the second plurality of clusters and determining whether to assign the first source identifier of the at least one cluster of the first plurality of clusters to one of the first cluster of the second plurality of clusters or the second cluster of the second plurality of clusters based on the comparison of the at least one attribute and the at least one corresponding attribute.

In some non-limiting embodiments or aspects, the attribute may include at least one of a total number of records in the first cluster of the second plurality of clusters, an aggregate of records of the at least one cluster of the first plurality of clusters that were sorted into the first cluster of the second plurality of clusters, an aggregate of records in a third cluster of the first plurality of clusters having identification data that substantially matches the first cluster of the second plurality of clusters, or an aggregate of records in the first cluster of the second plurality of clusters that are not associated with any cluster of the first plurality of clusters. Additionally or alternatively, the corresponding attribute may include at least one of a total number of records in the second cluster of the second plurality of clusters, an aggregate of records of the at least one cluster of the first plurality of clusters that were sorted into the second cluster of the second plurality of clusters, or an aggregate of records in the at least one cluster of the first plurality of clusters. In some non-limiting embodiments or aspects, the records may include payment transaction records. Additionally or alternatively, each payment transaction record may be one of transacting or non-transacting. Additionally or alternatively, the attribute may include at least one of a number of transacting records of the first cluster of the second plurality of clusters, a number of non-transacting records of the first cluster of the second plurality of clusters, or a total number of records of the first cluster of the second plurality of clusters. Additionally or alternatively, the corresponding attribute may include at least one of a number of transacting records of the second cluster of the second plurality of clusters, a number of non-transacting records of the second cluster of the second plurality of clusters, or a total number of records of the second cluster of the second plurality of clusters.

In some non-limiting embodiments or aspects, determining whether to assign the first source identifier of the at least one cluster of the first plurality of clusters to one of the first cluster of the second plurality of clusters or the second cluster of the second plurality of clusters may include, if a number of transacting records of the at least one cluster of the first plurality of clusters is 0, the number of non-transacting records of the first cluster of the second plurality of clusters is greater than 0, the number of transacting records of the first cluster of the second plurality of clusters is 0, and the number of non-transacting records of the second cluster of the second plurality of clusters is 0, assigning the first source identifier of the at least one cluster of the first plurality of clusters to the first cluster of the second plurality of clusters. In some non-limiting embodiments or aspects, determining whether to assign the first source identifier of the at least one cluster of the first plurality of clusters to one of the first cluster of the second plurality of clusters or the second cluster of the second plurality of clusters may include, if a number of transacting records and a number of non-transacting records of the at least one cluster of the first plurality of clusters is greater than 0, and the number of transacting records and the number of non-transacting records of the second cluster of the second plurality of clusters is greater than 0, assigning the first source identifier of the at least one cluster of the first plurality of clusters to the second cluster of the second plurality of clusters; if the number of transacting records and the number of non-transacting records of the at least one cluster of the first plurality of clusters is greater than 0, the number of transacting records of the first cluster of the second plurality of clusters is 0, and the number of non-transacting records of the first cluster of the second plurality of clusters is greater than 0, assigning the first source identifier of the at least one cluster of the first plurality of clusters to the second cluster of the second plurality of clusters; if a number of transacting records of a third cluster of the first plurality of clusters is greater than 0, and the identification data of the first cluster of the second plurality of clusters substantially matches the third cluster of the first plurality of clusters, assigning the first source identifier of the at least one cluster of the first plurality of clusters to the second cluster of the second plurality of clusters.

According to non-limiting embodiments or aspects, provided is a computer program product for managing source identifiers of clustered records. In some non-limiting embodiments or aspects, the computer program product may include at least one non-transitory computer-readable medium including one or more instructions that, when executed by at least one processor, cause the at least one processor to receive a plurality of records. Each record of the plurality of records may include identification data associated with a source of the respective record. The plurality of records may be sorted into a first plurality of clusters based on the identification data. Each cluster of the first plurality of clusters may include at least one record of the plurality of records. A first source identifier for each cluster of the first plurality of clusters may be generated. Update data associated with an update to the plurality of records may be received. At least some of the plurality of records may be sorted into a second plurality of clusters based on the identification data and the update data. A first cluster of the second plurality of clusters may have first identification data different from the identification data associated with at least one cluster of the first plurality of clusters and a second cluster of the second plurality of clusters may have second identification data that substantially matches the at least one cluster of the first plurality of clusters. Whether to assign the first source identifier of the at least one cluster of the first plurality of clusters to the first cluster of the second plurality of clusters may be determined.

In some non-limiting embodiments or aspects, the update data may include at least one of a modification of the identification data of at least some records of the plurality of records or additional records to be added to the plurality of records. In some non-limiting embodiments or aspects, a second source identifier for the second cluster of the second plurality of clusters may be generated. In some non-limiting embodiments or aspects, determining whether to assign the first source identifier of the at least one cluster of the first plurality of clusters to the first cluster of the second plurality of clusters may include comparing at least one attribute of the first cluster of the second plurality of clusters to at least one corresponding attribute of the second cluster of the second plurality of clusters and determining whether to assign the first source identifier of the at least one cluster of the first plurality of clusters to one of the first cluster of the second plurality of clusters or the second cluster of the second plurality of clusters based on the comparison of the at least one attribute and the at least one corresponding attribute.

In some non-limiting embodiments or aspects, the attribute may include at least one of a total number of records in the first cluster of the second plurality of clusters, an aggregate of records of the at least one cluster of the first plurality of clusters that were sorted into the first cluster of the second plurality of clusters, an aggregate of records in a third cluster of the first plurality of clusters having identification data that substantially matches the first cluster of the second plurality of clusters, or an aggregate of records in the first cluster of the second plurality of clusters that are not associated with any cluster of the first plurality of clusters. Additionally or alternatively, the corresponding attribute may include at least one of a total number of records in the second cluster of the second plurality of clusters, an aggregate of records of the at least one cluster of the first plurality of clusters that were sorted into the second cluster of the second plurality of clusters, or an aggregate of records in the at least one cluster of the first plurality of clusters. In some non-limiting embodiments or aspects, the records may include payment transaction records. Additionally or alternatively, each payment transaction record may be one of transacting or non-transacting. Additionally or alternatively, the attribute may include at least one of a number of transacting records of the first cluster of the second plurality of clusters, a number of non-transacting records of the first cluster of the second plurality of clusters, or a total number of records of the first cluster of the second plurality of clusters. Additionally or alternatively, the corresponding attribute may include at least one of a number of transacting records of the second cluster of the second plurality of clusters, a number of non-transacting records of the second cluster of the second plurality of clusters, or a total number of records of the second cluster of the second plurality of clusters.

In some non-limiting embodiments or aspects, determining whether to assign the first source identifier of the at least one cluster of the first plurality of clusters to one of the first cluster of the second plurality of clusters or the second cluster of the second plurality of clusters may include, if a number of transacting records of the at least one cluster of the first plurality of clusters is 0, the number of non-transacting records of the first cluster of the second plurality of clusters is greater than 0, the number of transacting records of the first cluster of the second plurality of clusters is 0, and the number of non-transacting records of the second cluster of the second plurality of clusters is 0, assigning the first source identifier of the at least one cluster of the first plurality of clusters to the first cluster of the second plurality of clusters. In some non-limiting embodiments or aspects, determining whether to assign the first source identifier of the at least one cluster of the first plurality of clusters to one of the first cluster of the second plurality of clusters or the second cluster of the second plurality of clusters may include, if a number of transacting records and a number of non-transacting records of the at least one cluster of the first plurality of clusters is greater than 0, and the number of transacting records and the number of non-transacting records of the second cluster of the second plurality of clusters is greater than 0, assigning the first source identifier of the at least one cluster of the first plurality of clusters to the second cluster of the second plurality of clusters; if the number of transacting records and the number of non-transacting records of the at least one cluster of the first plurality of clusters is greater than 0, the number of transacting records of the first cluster of the second plurality of clusters is 0, and the number of non-transacting records of the first cluster of the second plurality of clusters is greater than 0, assigning the first source identifier of the at least one cluster of the first plurality of clusters to the second cluster of the second plurality of clusters; if a number of transacting records of a third cluster of the first plurality of clusters is greater than 0, and the identification data of the first cluster of the second plurality of clusters substantially matches the third cluster of the first plurality of clusters, assigning the first source identifier of the at least one cluster of the first plurality of clusters to the second cluster of the second plurality of clusters.

Further embodiments or aspects are set forth in the following numbered clauses:

Clause 1: A method for managing source identifiers of clustered records, comprising: receiving, with at least one processor, a plurality of records, each record of the plurality of records comprising identification data associated with a source of the respective record; sorting, with the at least one processor, the plurality of records into a first plurality of clusters based on the identification data, each cluster of the first plurality of clusters including at least one record of the plurality of records; generating, with the at least one processor, a first source identifier for each cluster of the first plurality of clusters; receiving, with at least one processor, update data associated with an update to the plurality of records; sorting, with at least one processor, at least some of the plurality of records into a second plurality of clusters based on the identification data and the update data, wherein a first cluster of the second plurality of clusters has first identification data different from the identification data associated with at least one cluster of the first plurality of clusters and a second cluster of the second plurality of clusters has second identification data that substantially matches the at least one cluster of the first plurality of clusters; and determining, with the at least one processor, to assign the first source identifier of the at least one cluster of the first plurality of clusters to the first cluster of the second plurality of clusters.

Clause 2: The method of clause 1, wherein the update data comprises at least one of a modification of the identification data of at least some records of the plurality of records or additional records to be added to the plurality of records.

Clause 3: The method of any preceding clause, further comprising generating, with the at least one processer, a second source identifier for the second cluster of the second plurality of clusters.

Clause 4: The method of any preceding clause, wherein determining to assign the first source identifier of the at least one cluster of the first plurality of clusters to the first cluster of the second plurality of clusters comprises: comparing, with the at least one processor, at least one attribute of the first cluster of the second plurality of clusters to at least one corresponding attribute of the second cluster of the second plurality of clusters; and determining, with the at least one processor, whether to assign the first source identifier of the at least one cluster of the first plurality of clusters to one of the first cluster of the second plurality of clusters or the second cluster of the second plurality of clusters based on the comparison of the at least one attribute and the at least one corresponding attribute.

Clause 5: The method of any preceding clause, wherein the attribute comprises at least one of a total number of records in the first cluster of the second plurality of clusters, an aggregate of records of the at least one cluster of the first plurality of clusters that were sorted into the first cluster of the second plurality of clusters, an aggregate of records in a third cluster of the first plurality of clusters having identification data that substantially matches the first cluster of the second plurality of clusters, or an aggregate of records in the first cluster of the second plurality of clusters that are not associated with any cluster of the first plurality of clusters, and wherein the corresponding attribute comprises at least one of a total number of records in the second cluster of the second plurality of clusters, an aggregate of records of the at least one cluster of the first plurality of clusters that were sorted into the second cluster of the second plurality of clusters, or an aggregate of records in the at least one cluster of the first plurality of clusters.

Clause 6: The method of any preceding clause, wherein the records comprise payment transaction records, each payment transaction record being one of transacting or non-transacting, wherein the attribute comprises at least one of a number of transacting records of the first cluster of the second plurality of clusters, a number of non-transacting records of the first cluster of the second plurality of clusters, or a total number of records of the first cluster of the second plurality of clusters, and wherein the corresponding attribute comprises at least one of a number of transacting records of the second cluster of the second plurality of clusters, a number of non-transacting records of the second cluster of the second plurality of clusters, or a total number of records of the second cluster of the second plurality of clusters.

Clause 7: The method of any preceding clause, wherein determining whether to assign the first source identifier of the at least one cluster of the first plurality of clusters to one of the first cluster of the second plurality of clusters and the second cluster of the second plurality of clusters comprises: if a number of transacting records of the at least one cluster of the first plurality of clusters is 0, the number of non-transacting records of the first cluster of the second plurality of clusters is greater than 0, the number of transacting records of the first cluster of the second plurality of clusters is 0, and the number of non-transacting records of the second cluster of the second plurality of clusters is 0, assigning the first source identifier of the at least one cluster of the first plurality of clusters to the first cluster of the second plurality of clusters.

Clause 8: The method of any preceding clause, wherein determining whether to assign the first source identifier of the at least one cluster of the first plurality of clusters to one of the first cluster of the second plurality of clusters and the second cluster of the second plurality of clusters comprises: if a number of transacting records and a number of non-transacting records of the at least one cluster of the first plurality of clusters is greater than 0, and the number of transacting records and the number of non-transacting records of the second cluster of the second plurality of clusters is greater than 0, assigning the first source identifier of the at least one cluster of the first plurality of clusters to the second cluster of the second plurality of clusters; if the number of transacting records and the number of non-transacting records of the at least one cluster of the first plurality of clusters is greater than 0, the number of transacting records of the first cluster of the second plurality of clusters is 0, and the number of non-transacting records of the first cluster of the second plurality of clusters is greater than 0, assigning the first source identifier of the at least one cluster of the first plurality of clusters to the second cluster of the second plurality of clusters; and if a number of transacting records of a third cluster of the first plurality of clusters is greater than 0, and the identification data of the first cluster of the second plurality of clusters substantially matches the third cluster of the first plurality of clusters, assigning the first source identifier of the at least one cluster of the first plurality of clusters to the second cluster of the second plurality of clusters.

Clause 9: A system for managing source identifiers of clustered records, comprising: at least one processor; and at least one non-transitory computer-readable medium comprising instructions to direct the at least one processor to: receive a plurality of records, each record of the plurality of records comprising identification data associated with a source of the respective record; sort the plurality of records into a first plurality of clusters based on the identification data, each cluster of the first plurality of clusters including at least one record of the plurality of records; generate a first source identifier for each cluster of the first plurality of clusters; receive update data associated with an update to the plurality of records; sort at least some of the plurality of records into a second plurality of clusters based on the identification data and the update data, wherein a first cluster of the second plurality of clusters has first identification data different from the identification data associated with at least one cluster of the first plurality of clusters and a second cluster of the second plurality of clusters has second identification data that substantially matches the at least one cluster of the first plurality of clusters; and determine to assign the first source identifier of the at least one cluster of the first plurality of clusters to the first cluster of the second plurality of clusters.

Clause 10: The system of clause 9, wherein the update data comprises at least one of a modification of the identification data of at least some records of the plurality of records or additional records to be added to the plurality of records.

Clause 11: The system of clause 9 or 10, wherein the instructions further direct the at least one processor to generate a second source identifier for the second cluster of the second plurality of clusters.

Clause 12: The system of any one of clauses 9-11, wherein determining to assign the first source identifier of the at least one cluster of the first plurality of clusters to the first cluster of the second plurality of clusters comprises: comparing at least one attribute of the first cluster of the second plurality of clusters to at least one corresponding attribute of the second cluster of the second plurality of clusters; and determining whether to assign the first source identifier of the at least one cluster of the first plurality of clusters to one of the first cluster of the second plurality of clusters or the second cluster of the second plurality of clusters based on the comparison of the at least one attribute and the at least one corresponding attribute.

Clause 13: The system of any one of clauses 9-12, wherein the attribute comprises at least one of a total number of records in the first cluster of the second plurality of clusters, an aggregate of records of the at least one cluster of the first plurality of clusters that were sorted into the first cluster of the second plurality of clusters, an aggregate of records in a third cluster of the first plurality of clusters having identification data that substantially matches the first cluster of the second plurality of clusters, or an aggregate of records in the first cluster of the second plurality of clusters that are not associated with any cluster of the first plurality of clusters, and wherein the corresponding attribute comprises at least one of a total number of records in the second cluster of the second plurality of clusters, an aggregate of records of the at least one cluster of the first plurality of clusters that were sorted into the second cluster of the second plurality of clusters, or an aggregate of records in the at least one cluster of the first plurality of clusters.

Clause 14: The system of any one of clauses 9-13, wherein the records comprise payment transaction records, each payment transaction record being one of transacting or non-transacting, wherein the attribute comprises at least one of a number of transacting records of the first cluster of the second plurality of clusters, a number of non-transacting records of the first cluster of the second plurality of clusters, or a total number of records of the first cluster of the second plurality of clusters, and wherein the corresponding attribute comprises at least one of a number of transacting records of the second cluster of the second plurality of clusters, a number of non-transacting records of the second cluster of the second plurality of clusters, or a total number of records of the second cluster of the second plurality of clusters.

Clause 15: The system of any one of clauses 9-14, wherein determining whether to assign the first source identifier of the at least one cluster of the first plurality of clusters to one of the first cluster of the second plurality of clusters and the second cluster of the second plurality of clusters comprises: if a number of transacting records of the at least one cluster of the first plurality of clusters is 0, the number of non-transacting records of the first cluster of the second plurality of clusters is greater than 0, the number of transacting records of the first cluster of the second plurality of clusters is 0, and the number of non-transacting records of the second cluster of the second plurality of clusters is 0, assigning the first source identifier of the at least one cluster of the first plurality of clusters to the first cluster of the second plurality of clusters.

Clause 16: The system of any one of clauses 9-15, wherein determining whether to assign the first source identifier of the at least one cluster of the first plurality of clusters to one of the first cluster of the second plurality of clusters and the second cluster of the second plurality of clusters comprises: if a number of transacting records and a number of non-transacting records of the at least one cluster of the first plurality of clusters is greater than 0, and the number of transacting records and the number of non-transacting records of the second cluster of the second plurality of clusters is greater than 0, assigning the first source identifier of the at least one cluster of the first plurality of clusters to the second cluster of the second plurality of clusters; if the number of transacting records and the number of non-transacting records of the at least one cluster of the first plurality of clusters is greater than 0, the number of transacting records of the first cluster of the second plurality of clusters is 0, and the number of non-transacting records of the first cluster of the second plurality of clusters is greater than 0, assigning the first source identifier of the at least one cluster of the first plurality of clusters to the second cluster of the second plurality of clusters; if a number of transacting records of a third cluster of the first plurality of clusters is greater than 0, and the identification data of the first cluster of the second plurality of clusters substantially matches the third cluster of the first plurality of clusters, assigning the first source identifier of the at least one cluster of the first plurality of clusters to the second cluster of the second plurality of clusters.

Clause 17: A computer program product for managing source identifiers of clustered records, the computer program product comprising at least one non-transitory computer-readable medium including one or more instructions that, when executed by at least one processor, cause the at least one processor to: receive a plurality of records, each record of the plurality of records comprising identification data associated with a source of the respective record; sort the plurality of records into a first plurality of clusters based on the identification data, each cluster of the first plurality of clusters including at least one record of the plurality of records; generate a first source identifier for each cluster of the first plurality of clusters; receive update data associated with an update to the plurality of records; sort at least some of the plurality of records into a second plurality of clusters based on the identification data and the update data, wherein a first cluster of the second plurality of clusters has first identification data different from the identification data associated with at least one cluster of the first plurality of clusters and a second cluster of the second plurality of clusters has second identification data that substantially matches the at least one cluster of the first plurality of clusters; and determine to assign the first source identifier of the at least one cluster of the first plurality of clusters to the first cluster of the second plurality of clusters.

Clause 18: The computer program product of clause 17, wherein the update data comprises at least one of a modification of the identification data of at least some records of the plurality of records or additional records to be added to the plurality of records.

Clause 19: The computer program product of clause 17 or 18, wherein the instructions further direct the at least one processor to generate a second source identifier for the second cluster of the second plurality of clusters.

Clause 20: The computer program product of any one of clauses 17-19, wherein determining to assign the first source identifier of the at least one cluster of the first plurality of clusters to the first cluster of the second plurality of clusters comprises: comparing at least one attribute of the first cluster of the second plurality of clusters to at least one corresponding attribute of the second cluster of the second plurality of clusters; and determining whether to assign the first source identifier of the at least one cluster of the first plurality of clusters to one of the first cluster of the second plurality of clusters or the second cluster of the second plurality of clusters based on the comparison of the at least one attribute and the at least one corresponding attribute.

Clause 21: The computer program product of any one of clauses 17-20, wherein the attribute comprises at least one of a total number of records in the first cluster of the second plurality of clusters, an aggregate of records of the at least one cluster of the first plurality of clusters that were sorted into the first cluster of the second plurality of clusters, an aggregate of records in a third cluster of the first plurality of clusters having identification data that substantially matches the first cluster of the second plurality of clusters, or an aggregate of records in the first cluster of the second plurality of clusters that are not associated with any cluster of the first plurality of clusters, and wherein the corresponding attribute comprises at least one of a total number of records in the second cluster of the second plurality of clusters, an aggregate of records of the at least one cluster of the first plurality of clusters that were sorted into the second cluster of the second plurality of clusters, or an aggregate of records in the at least one cluster of the first plurality of clusters.

Clause 22: The computer program product of any one of clauses 17-21, wherein the records comprise payment transaction records, each payment transaction record being one of transacting or non-transacting, wherein the attribute comprises at least one of a number of transacting records of the first cluster of the second plurality of clusters, a number of non-transacting records of the first cluster of the second plurality of clusters, or a total number of records of the first cluster of the second plurality of clusters, and wherein the corresponding attribute comprises at least one of a number of transacting records of the second cluster of the second plurality of clusters, a number of non-transacting records of the second cluster of the second plurality of clusters, or a total number of records of the second cluster of the second plurality of clusters.

Clause 23: The computer program product of any one of clauses 17-22, wherein determining whether to assign the first source identifier of the at least one cluster of the first plurality of clusters to one of the first cluster of the second plurality of clusters and the second cluster of the second plurality of clusters comprises: if a number of transacting records of the at least one cluster of the first plurality of clusters is 0, the number of non-transacting records of the first cluster of the second plurality of clusters is greater than 0, the number of transacting records of the first cluster of the second plurality of clusters is 0, and the number of non-transacting records of the second cluster of the second plurality of clusters is 0, assigning the first source identifier of the at least one cluster of the first plurality of clusters to the first cluster of the second plurality of clusters.

Clause 24: The computer program product of any one of clauses 17-23, wherein determining whether to assign the first source identifier of the at least one cluster of the first plurality of clusters to one of the first cluster of the second plurality of clusters and the second cluster of the second plurality of clusters comprises: if a number of transacting records and a number of non-transacting records of the at least one cluster of the first plurality of clusters is greater than 0, and the number of transacting records and the number of non-transacting records of the second cluster of the second plurality of clusters is greater than 0, assigning the first source identifier of the at least one cluster of the first plurality of clusters to the second cluster of the second plurality of clusters; if the number of transacting records and the number of non-transacting records of the at least one cluster of the first plurality of clusters is greater than 0, the number of transacting records of the first cluster of the second plurality of clusters is 0, and the number of non-transacting records of the first cluster of the second plurality of clusters is greater than 0, assigning the first source identifier of the at least one cluster of the first plurality of clusters to the second cluster of the second plurality of clusters; if a number of transacting records of a third cluster of the first plurality of clusters is greater than 0, and the identification data of the first cluster of the second plurality of clusters substantially matches the third cluster of the first plurality of clusters, assigning the first source identifier of the at least one cluster of the first plurality of clusters to the second cluster of the second plurality of clusters.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which:

FIGS. 4A-4E are diagrams of a non-limiting embodiment of an implementation of a non-limiting embodiment of the process shown in FIG. 3 according to the principles of the presently disclosed subject matter.

DESCRIPTION

Figure 1:
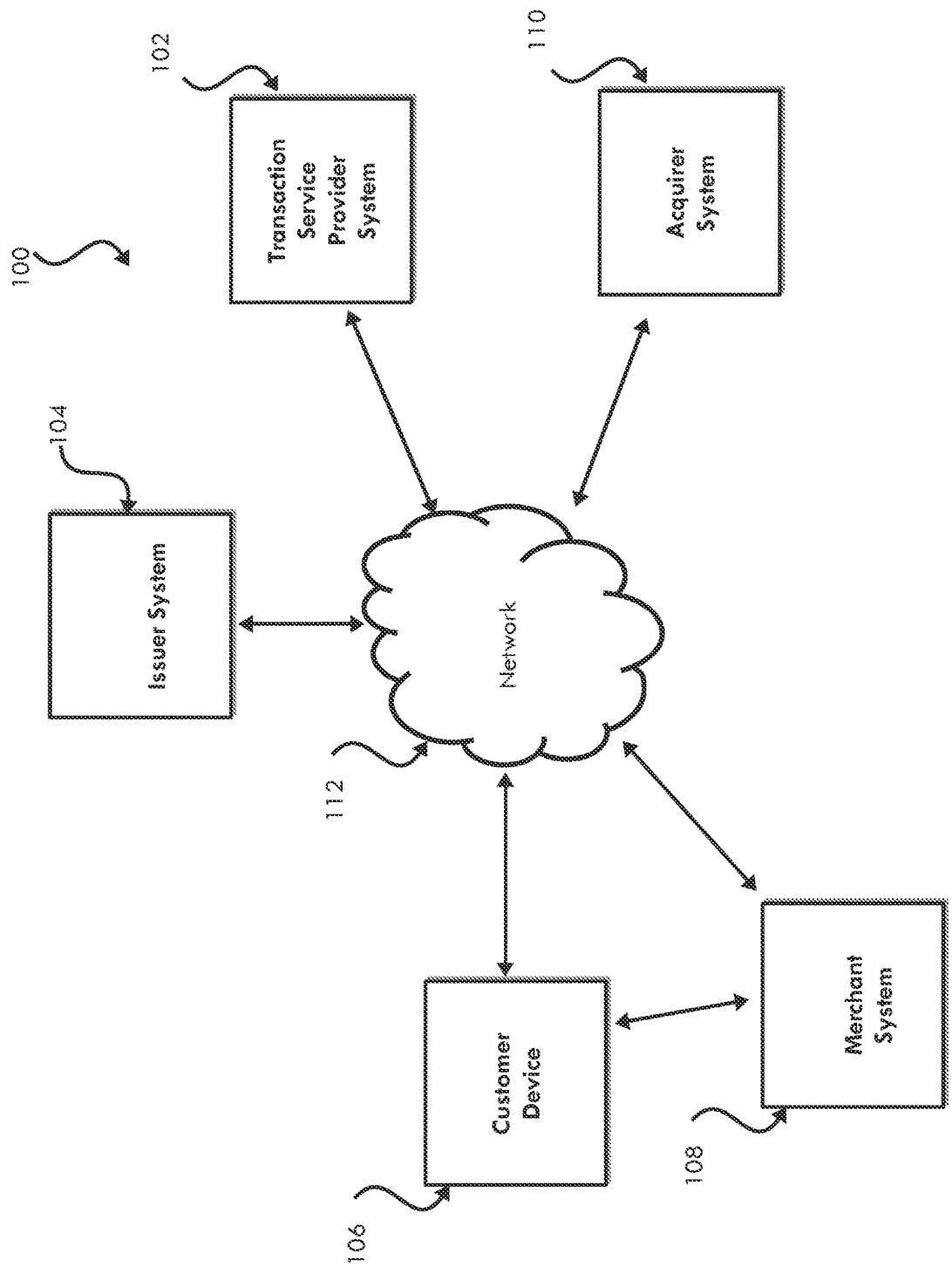
FIG. 1 is a diagram of a non-limiting embodiment or aspect of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a token, and/or the like). In some non-limiting embodiments or aspects, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments or aspects, a payment token may be "format preserving" and may have a numeric format that conforms to the account identifiers used in existing payment processing networks (e.g., ISO 8583 financial transaction message format). In some non-limiting embodiments or aspects, a payment token may be used in place of a PAN to initiate, authorize, settle, or resolve a payment transaction or represent the original credential in other systems where the original credential would typically be provided. In some non-limiting embodiments or aspects, a token value may be generated such that the recovery of the original PAN or other account identifier from the token value may not be computationally derived (e.g., with a one-way hash or other cryptographic function). Further, in some non-limiting embodiments or aspects, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments or aspects, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments or aspects, a requestor may interface with a network token system through any suitable communication network and/or protocol (e.g., using HTTPS, SOAP, and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments or aspects, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments or aspects, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments or aspects, token requestor identifiers may be revoked and/or token requestors may be assigned new token requestor identifiers. In some non-limiting embodiments or aspects, this information may be subject to reporting and audit by the token service provider.

As used herein, the term "token service provider" may refer to an entity including one or more server computers in a token service system that generates, processes, and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments or aspects, the token service provider may have the ability to set aside licensed Bank Identification Numbers (BINs) as token BINs to issue tokens for the PANs that may be submitted to the token service provider. In some non-limiting embodiments or aspects, various entities of a tokenization ecosystem may assume the roles of the token service provider. For example, payment networks and issuers or their agents may become the token service provider by implementing the token services according to non-limiting embodiments or aspects of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments or aspects, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments or aspects, the token vault may be a part of a token service system. For example, the token vault may be provided as a part of the token service provider. Additionally or alternatively, the token vault may be a remote repository accessible by the token service provider. In some non-limiting embodiments or aspects, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

For the purpose of illustration, in the following description, while the presently disclosed subject matter is described with respect to methods, systems, and computer program products for managing source identifiers of clustered records, e.g., based on attributes of the clusters, one skilled in the art will recognize that the disclosed subject matter is not limited to the illustrative embodiments or aspects. For example, the methods, systems, and computer program products described herein may be used with a wide variety of settings.

Referring now to FIG. 1, FIG. 1 is a diagram of a non-limiting embodiment or aspect of an environment 100 in which systems, products, and/or methods, as described herein, may be implemented. As shown in FIG. 1, environment 100 includes transaction service provider system 102, issuer system 104, customer device 106, merchant system 108, acquirer system 110, and network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to transaction service provider system 102. In some non-limiting embodiments or aspects, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via network 112. Additionally or alternatively, each customer device 106 may include a device capable of receiving information from and/or communicating information to other customer devices 106 via network 112, another network (e.g., an ad hoc network, a local network, a private network, a virtual private network, and/or the like), and/or any other suitable communication technique. For example, customer device 106 may include a client device and/or the like. In some non-limiting embodiments or aspects, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via the network, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments or aspects, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
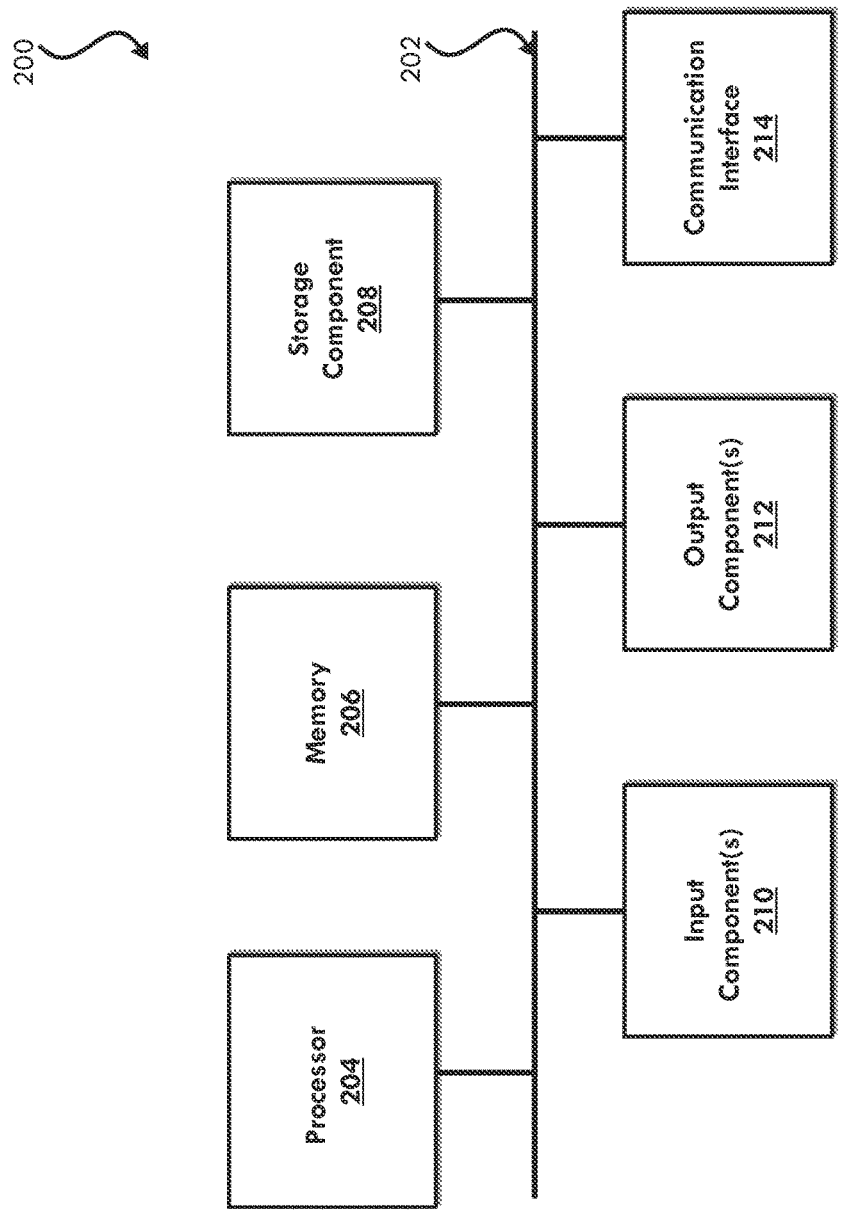
FIG. 2 is a diagram of a non-limiting embodiment or aspect of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments or aspects, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
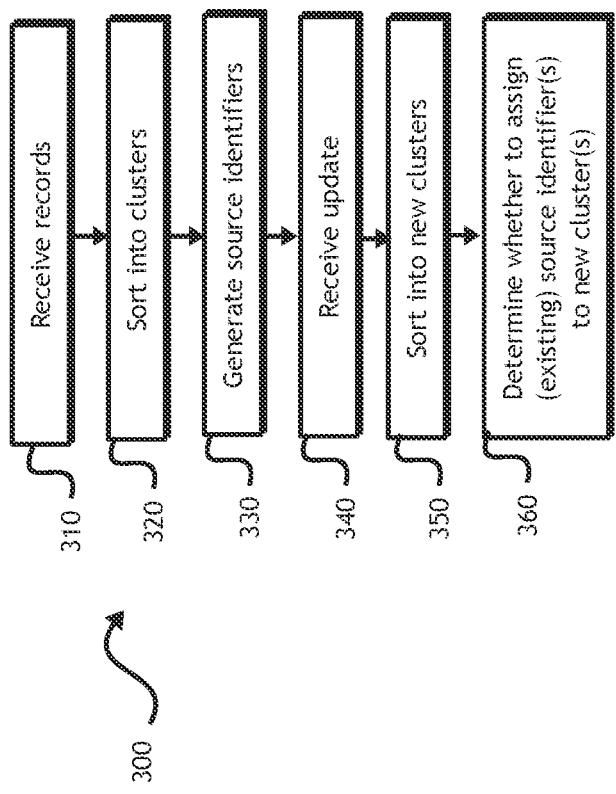
FIG. 3 is a flowchart of a non-limiting embodiment or aspect of a process for managing source identifiers of clustered records.

Referring now to FIG. 3, FIG. 3 is a flowchart of a non-limiting embodiment or aspect of a process 300 for managing source identifiers of clustered records. In some non-limiting embodiments or aspects, one or more of the steps of process 300 may be performed (e.g., completely, partially, and/or the like) by transaction service provider system 102 (e.g., one or more devices of transaction service provider system 102). In some non-limiting embodiments or aspects, one or more of the steps of process 300 may be performed (e.g., completely, partially, and/or the like) by another system, another device, another group of systems, or another group of devices, separate from or including transaction service provider system 102, such as merchant system 108 (e.g., one or more devices of merchant system 108), issuer system 104 (e.g., one or more devices of issuer system 104), customer device 106, and/or acquirer system 110 (e.g., one or more devices of acquirer system 110).

As shown in FIG. 3, at step 310, process 300 may include receiving records (e.g., transaction records, such as payment transaction records). For example, transaction service provider system 102 may receive (e.g., from one or more merchants systems 108, issuer systems 104, acquirer systems 110, and/or the like) a plurality of records. In some non-limiting embodiments or aspects, each record of the plurality of records may include identification data (e.g., name information, address information, and/or the like) associated with a source of the respective record (e.g., a merchant).

As shown in FIG. 3, at step 320, process 300 may include sorting the records into clusters. For example, transaction service provider system 102 may sort the plurality of records into a first plurality of clusters based on the identification data. In some non-limiting embodiments or aspects, each cluster of the first plurality of clusters may include at least one of the records.

As shown in FIG. 3, at step 330, process 300 may include generating source identifiers. For example, transaction service provider system 102 may generate a first source identifier for each cluster of the first plurality of clusters. In some non-limiting embodiments or aspects, each source identifier may be based on the identification data associated with the record(s) of the respective cluster.

As shown in FIG. 3, at step 340, process 300 may include receiving an update. For example, transaction service provider system 102 may receive (e.g., from one or more merchant systems 108, issuer systems 104, acquirer systems 110, and/or the like) update data associated with an update to the plurality of records. In some non-limiting embodiments or aspects, the update data may include a modification of the identification data of at least some records of the plurality of records, additional records to be added to the plurality of records, a deletion of at least some records from the plurality of records, a combination thereof, and/or the like.

As shown in FIG. 3, at step 350, process 300 may include sorting at least some of the records (as updated) into new clusters. For example, transaction service provider system 102 may sort at least some of the plurality of records into a second plurality of clusters based on the identification data, the update data, and/or the like. In some non-limiting embodiments or aspects, a first cluster of the second plurality of clusters may have first identification data different from the identification data associated with at least one cluster of the first plurality of clusters, and/or at least some records of the at least one cluster of the first plurality of clusters may have been sorted into the first cluster (e.g., based on the update data). Additionally or alternatively, a second cluster of the second plurality of clusters may have second identification data that substantially matches (e.g., exactly matches, matches within a predetermined tolerance, matches based on fuzzy matching, matches closely enough to have been sorted into the same cluster, and/or the like) the at least one cluster of the first plurality of clusters, and/or at least some records of the at least one cluster of the first plurality of clusters may have been sorted into the second cluster (e.g., records remain in a cluster having the same identification data as in the first plurality of clusters, except for records being re-sorted into new clusters such as the first cluster).

As shown in FIG. 3, at step 360, process 300 may include determining whether to assign the (existing) source identifier(s) of at least some of the first plurality of clusters to at least some of the new cluster(s). For example, transaction service provider system 102 may determine to assign the first source identifier of the at least one cluster of the first plurality of clusters to the first cluster of the second plurality of clusters or the second cluster of the second plurality of clusters.

In some non-limiting embodiments or aspects if the first source identifier of the at least one cluster of the first plurality of clusters is assigned to the first cluster, a second source identifier may be generated (e.g., by transaction service provider system 102) for the second cluster. In some non-limiting embodiments or aspects, if the first source identifier of the at least one cluster of the first plurality of clusters is assigned to the second cluster, a second source identifier may be generated (e.g., by transaction service provider system 102) for the first cluster.

In some non-limiting embodiments or aspects, transaction service provider system 102 may compare at least one attribute of the first cluster of the second plurality of clusters to at least one corresponding attribute of the second cluster of the second plurality of clusters. Additionally or alternatively, transaction service provider system 102 may determine whether to assign the first source identifier of the at least one cluster of the first plurality of clusters to one of the first cluster of the second plurality of clusters or the second cluster of the second plurality of clusters based on the comparison of the at least one attribute and the at least one corresponding attribute.

In some non-limiting embodiments or aspects, the attribute may include at least one of a total number of records in the first cluster of the second plurality of clusters, an aggregate of records of the at least one cluster of the first plurality of clusters that were sorted into the first cluster of the second plurality of clusters, an aggregate of records in a third cluster of the first plurality of clusters having identification data that substantially matches the first cluster of the second plurality of clusters, an aggregate of records in the first cluster of the second plurality of clusters that are not associated with any cluster of the first plurality of clusters, and/or the like. Additionally or alternatively, the corresponding attribute may include at least one of a total number of records in the second cluster of the second plurality of clusters, an aggregate of records of the at least one cluster of the first plurality of clusters that were sorted into the second cluster of the second plurality of clusters, an aggregate of records in the at least one cluster of the first plurality of clusters, and/or the like.

In some non-limiting embodiments or aspects, the records may include payment transaction records. In some non-limiting embodiments or aspects, each payment transaction record may be one of transacting or non-transacting. For example, a transacting record may refer to a record from a source (e.g., merchant) that is still actively creating new records (e.g., still completing payment transactions using the respective identification data within a predetermined and/or dynamic time period). Additionally or alternatively, non-transacting records may refer to a record from a source (e.g., merchant) that is not actively creating new records (e.g., has not completed a payment transaction with the respective identification data within a predetermined and/or dynamic time period). In some non-limiting embodiments or aspects, the attribute may include at least one of a number of transacting records of the first cluster of the second plurality of clusters, a number of non-transacting records of the first cluster of the second plurality of clusters, a total number of records of the first cluster of the second plurality of clusters, and/or the like. Additionally or alternatively, the corresponding attribute may include at least one of a number of transacting records of the second cluster of the second plurality of clusters, a number of non-transacting records of the second cluster of the second plurality of clusters, a total number of records of the second cluster of the second plurality of clusters, and/or the like.

In some non-limiting embodiments or aspects, if a number of transacting records of the at least one cluster of the first plurality of clusters is 0, the number of non-transacting records of the first cluster of the second plurality of clusters is greater than 0, the number of transacting records of the first cluster of the second plurality of clusters is 0, and the number of non-transacting records of the second cluster of the second plurality of clusters is 0, the first source identifier of the at least one cluster of the first plurality of clusters may be assigned to the first cluster of the second plurality of clusters (e.g., by transaction service provider system 102).

In some non-limiting embodiments or aspects, if a number of transacting records and a number of non-transacting records of the at least one cluster of the first plurality of clusters is greater than 0, and the number of transacting records and the number of non-transacting records of the second cluster of the second plurality of clusters is greater than 0, the first source identifier of the at least one cluster of the first plurality of clusters may be assigned to the second cluster of the second plurality of clusters (e.g., by transaction service provider system 102).

In some non-limiting embodiments or aspects, if the number of transacting records and the number of non-transacting records of the at least one cluster of the first plurality of clusters is greater than 0, the number of transacting records of the first cluster of the second plurality of clusters is 0, and the number of non-transacting records of the first cluster of the second plurality of clusters is greater than 0, the first source identifier of the at least one cluster of the first plurality of clusters may be assigned to the second cluster of the second plurality of clusters (e.g., by transaction service provider system 102).

In some non-limiting embodiments or aspects, if a number of transacting records of a third cluster of the first plurality of clusters is greater than 0 and the identification data of the first cluster of the second plurality of clusters substantially matches the third cluster of the first plurality of clusters, the first source identifier of the at least one cluster of the first plurality of clusters may be assigned to the second cluster of the second plurality of clusters (e.g., by transaction service provider system 102).

Referring now to FIGS. 4A-4E, FIGS. 4A-4E are diagrams of an exemplary implementation 400 of a non-limiting embodiment relating to process 300 shown in FIG. 3. In some non-limiting embodiments or aspects, implementation 400 may be performed (e.g., completely, partially, and/or the like) by transaction service provider system 102 (e.g., one or more devices of transaction service provider system 102). In some non-limiting embodiments or aspects, implementation 400 may be performed (e.g., completely, partially, and/or the like) by another system, another device, another group of systems, or another group of devices, separate from or including transaction service provider system 102, such as merchant system 108 (e.g., one or more devices of merchant system 108), issuer system 104 (e.g., one or more devices of issuer system 104), customer device 106, and/or acquirer system 110 (e.g., one or more devices of acquirer system 110).

As shown in FIG. 4A, implementation 400 may include a plurality of records (e.g., transaction records, such as payment transaction records), including first record 401a, second record 402a, and/or the like. For example, transaction service provider system 102 may receive (e.g., from one or more merchants systems 108, issuer systems 104, acquirer systems 110, and/or the like) the plurality of records. In some non-limiting embodiments or aspects, each record of the plurality of records may include identification data (e.g., name information, address information, and/or the like) associated with a source of the respective record (e.g., a merchant). For example, first record 401a may include a first name Nx and a first address Ax, and second record 402a may include a second name Nx' and second address Ax'. In some non-limiting embodiments or aspects, second name Nx' may be the same as or similar to first name Nx, and second address Ax' may be the same as or similar to first address Ax.

In some non-limiting embodiments or aspects, the plurality of records may be sorted into a first plurality of clusters based on the identification data. For example, transaction service provider system 102 may sort first record 401a and second record 402a into a first cluster 411a. Additionally or alternatively, first cluster 411a may be associated with and/or based on identification data, e.g., name N1 and address A1. In some non-limiting embodiments or aspects, name N1 may be the same as or similar to at least one of first name Nx or second name Nx', and address A1 may be the same as or similar to at least one of first address Ax or second address Ax'.

In some non-limiting embodiments or aspects, a source identifier may be generated for each cluster. For example, transaction service provider system 102 may generate a first source identifier for each cluster of the first plurality of clusters. For example, a first source identifier S1 may be generated based on name N1 and address A1.

In some non-limiting embodiments or aspects, constituent elements of a source identifier may include records (e.g., identification data from records). For example, such records (e.g., identification data thereof) may represent a granular form of identification of the source (e.g., merchant). Additionally or alternatively, multiple records may be clustered (e.g., grouped, sorted, and/or the like) to form a cluster associated with a source identifier. For example, records may be clustered by a matching engine (e.g., of transaction service provider system 102), which may generate a source identifier for every record. In some non-limiting embodiments or aspects, after clustering, a source identifier may be generated based on identification data (e.g., a name and address key pair, other identification data as described herein, and/or the like) of the records in a cluster. In some non-limiting embodiments or aspects, as the identification data (e.g., names, addresses, and/or the like) of records undergo processing and periodic changes/updates, the identification data (e.g., name and address key pairs) associated with such records may change/update. In some non-limiting embodiments or aspects, each name and address key pair may have a one-to-one relationship with a source identifier. In some non-limiting embodiments or aspects, under certain circumstances (as described herein), the source identifier may be re-assigned to a different name and address key pair based on updated identification data of at least one record. For example, if a record undergoes changes/updates and the name and address key pair associated therewith is changed/updated, the record may (under certain circumstances, as described herein) retain its old source identifier. As such, downstream changes based on the source identifier may be reduced (e.g., prevented, eliminated, decreased, and/or the like).

In some non-limiting embodiments or aspects, first record 401a and second record 402a may be sorted into a first cluster 411a (e.g., by a matching engine of transaction service provider system 102), as described herein. A first source identifier S1 may be assigned to first cluster 411a, as described herein.

Figure 4B:
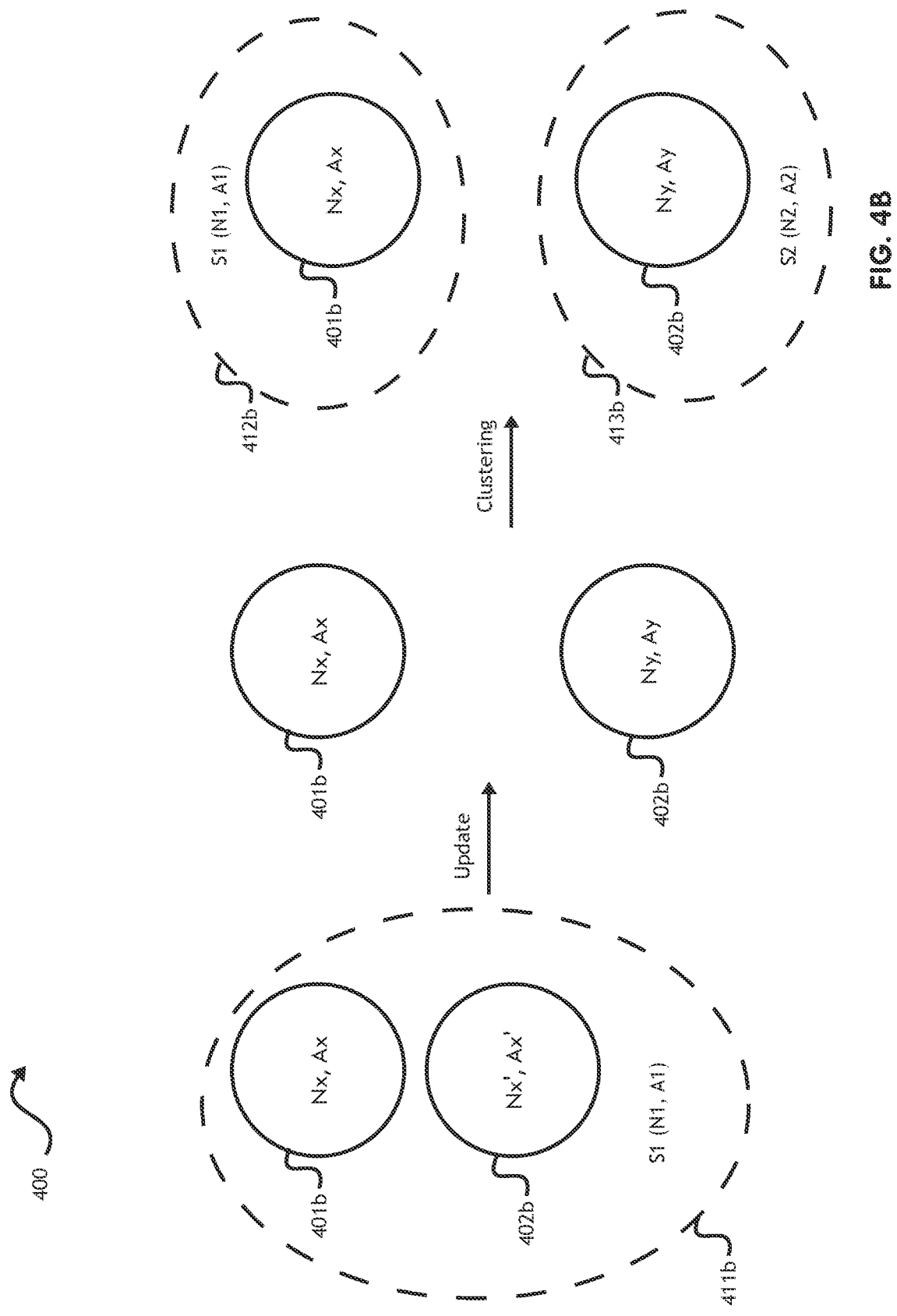

As shown in FIG. 4B, implementation 400 may include a plurality of records (e.g., transaction records, such as payment transaction records), including first record 401b, second record 402b, and/or the like. For example, transaction service provider system 102 may receive (e.g., from one or more merchants systems 108, issuer systems 104, acquirer systems 110, and/or the like) the plurality of records. In some non-limiting embodiments or aspects, each record of the plurality of records may include identification data (e.g., name information, address information, and/or the like) associated with a source of the respective record (e.g., a merchant). For example, first record 401b may include a first name Nx and a first address Ax, and second record 402b may include a second name Nx' and second address Ax'. In some non-limiting embodiments or aspects, second name Nx' may be the same as or similar to first name Nx, and second address Ax' may be the same as or similar to first address Ax.

In some non-limiting embodiments or aspects, first record 401b and second record 402b may be sorted into a first cluster 411b (e.g., by a matching engine of transaction service provider system 102), as described herein. A first source identifier /S1 may be assigned to first cluster 411b, as described herein. Additionally or alternatively, first cluster 411b may be associated with and/or based on identification data, e.g., name N1 and address A1. In some non-limiting embodiments or aspects, name N1 may be the same as or similar to at least one of first name Nx or second name Nx', and address A1 may be the same as or similar to at least one of first address Ax or second address Ax', as described herein.

In some non-limiting embodiments or aspects, after an update (e.g., receiving update data by transaction service provider system 102, as described herein), second record 402b may undergo a change/update to its identification data (e.g., name, address, and/or the like). For example, changes/updates may occur as a result of change in the merchant location, changes to the attribute enrichment processes, and/or the like. In some non-limiting embodiments or aspects, after the update, second record 402b may be associated with at least one of a new name Ny or a new address Ay. In some non-limiting embodiments or aspects, transaction service provider system 102 (e.g., a matching engine thereof) may determine that the records now belong to different clusters (e.g., of a second plurality of clusters), e.g., first record 401b may be sorted into second cluster 412b and second record 402b may be sorted into third cluster 413b.

In some non-limiting embodiments or aspects, second cluster 412b may retain source identifier S1, which may be associated with and/or based on identification data, e.g., name N1 and address A1, which may be the same as name Nx and address Ax, respectively. Additionally or alternatively, third cluster 413b may be assigned a new source identifier S2, which may be associated with and/or based on identification data, e.g., name N2 and address A2, which may be the same as name Ny and address Ay, respectively.

As shown in FIG. 4C, implementation 400 may include a plurality of records (e.g., transaction records, such as payment transaction records), including first record 401c, second record 402c, and/or the like. For example, transaction service provider system 102 may receive (e.g., from one or more merchants systems 108, issuer systems 104, acquirer systems 110, and/or the like) the plurality of records. In some non-limiting embodiments or aspects, each record of the plurality of records may include identification data (e.g., name information, address information, and/or the like) associated with a source of the respective record (e.g., a merchant). For example, first record 401c may include a first name Nx and a first address Ax, and second record 402c may include a second name Nx' and second address Ax'. In some non-limiting embodiments or aspects, second name Nx' may be the same as or similar to first name Nx, and second address Ax' may be the same as or similar to first address Ax.

In some non-limiting embodiments or aspects, first record 401c and second record 402c may be sorted into a first cluster 411c (e.g., by a matching engine of transaction service provider system 102), as described herein. A first source identifier S1 may be assigned to first cluster 411c, as described herein. Additionally or alternatively, first cluster 411c may be associated with and/or based on identification data, e.g., name N1 and address A1. In some non-limiting embodiments or aspects, name N1 may be the same as or similar to at least one of first name Nx or second name Nx', and address A1 may be the same as or similar to at least one of first address Ax or second address Ax', as described herein.

In some non-limiting embodiments or aspects, after an update (e.g., receiving update data by transaction service provider system 102, as described herein), second record 402c may undergo a change/update to its identification data (e.g., name, address, and/or the like). For example, changes/updates may occur as a result of change in the merchant location, changes to the attribute enrichment processes, and/or the like. In some non-limiting embodiments or aspects, after the update, second record 402c may be associated with at least one of a new name Ny or a new address Ay. In some non-limiting embodiments or aspects, transaction service provider system 102 (e.g., a matching engine thereof) may determine that the records now belong to different clusters (e.g., of a second plurality of clusters), e.g., first record 401c may be sorted into second cluster 412b and second record 402c may be sorted into third cluster 413c.

In some non-limiting embodiments or aspects, second cluster 412c may be assigned a new source identifier S2, which may be associated with and/or based on identification data, e.g., name N2 and address A2, which may be the same as name Nx and address Ax, respectively. Additionally or alternatively, third cluster 413c may retain source identifier S1, which may be associated with and/or based on identification data, e.g., name N1 and address A1, which may be the same as name Ny and address Ay, respectively.

In some non-limiting embodiments or aspects, the decision whether source identifier S1 is retained by a second cluster (e.g., second cluster 412b as shown in FIG. 4B) or a third cluster (e.g., third cluster 413c as shown in FIG. 4C) may be based on rules associated with attributes of the respective clusters. For example, the attributes may include a type (e.g., transacting or non-transacting) of record in each cluster, as described herein. Additionally or alternatively, the attributes may include an aggregate (e.g., count of records in a cluster, count of transacting records in a cluster, count of non-transacting records in a cluster, and/or the like) based on records in each cluster, as described herein. Additionally or alternatively, when a record is sorted into a different cluster after the update (e.g., from first cluster to second cluster or third cluster), aggregates may include an aggregate of records moving from the old cluster to the new cluster, an aggregate of records in the old cluster before movement, an aggregate of records in the new cluster before movement, an aggregate of new records moving into the new cluster, and/or the like, as described herein.

In some non-limiting embodiments or aspects, the rules may be represented as in the following list (using a notation in which OLD_NA refers to the name and address key pair of the old cluster, NEW_NA refers to the name and address key pair of the new cluster, SCA refers to a non-transacting record, and SPA refers to a transacting record): Rule 1: If OLD_NA has only SCA, all the SCA have moved to a single NEW_NA, and NEW_NA has been created based on the update, then old source identifier assigned to/associated with NEW_NA;

Rule 2: If OLD_NA has both SCA and SPA and at least one SCA and at least one SPA are still retained with OLD_NA, then old source identifier assigned to/remains associated with OLD_NA (e.g., no other NEW_NA in NEW_NA may be assigned to/associated with the old source identifier)

Rule 3: If OLD_NA has both SCA and SPA and only SCA records are flowing to NEW_NA, then old source identifier assigned to/remains associated with OLD_NA (e.g., NEW_NA may not be assigned to/associated with the old source identifier)

Rule 4: If any NEW_NA already has SPA (e.g., before update), then old source identifier assigned to/remains associated with OLD_NA (e.g., NEW_NA may not be assigned to/associated with the old source identifier)

Rule 5: If more than one NEW_NA satisfies Rule 1, the NEW_NA with larger volume of records (or larger number of SPA) moving from OLD_NA to NEW_NA will be assigned to/associated with old source identifier Additionally or alternatively, in some non-limiting embodiments or aspects, the rules may further include the following list if more than one NEW_NA is competing for the old source identifier:

Rule 6: If any NEW_NA being assigned to/associated with old source identifier would be due to movement of all source records from OLD_NA to NEW_NA, that NEW_NA gets the highest priority to retain old source identifier.

Rule 7: If any NEW_NA being assigned to/associated with old source identifier would have at least one SCA moving from OLD_NA to NEW_NA along with SPA, that NEW_NA gets the next highest priority to retain old source identifier.

Rule 8: If any NEW_NA being assigned to/associated with old source identifier would not be decided based on Rule 5, that NEW_NA gets the next highest priority to retain old source identifier.

Rule 9: If any NEW_NA being assigned to/associated with old source identifier would be formed by Rule 1, that NEW_NA gets the least priority.

Rule 10: If OLD_NA has same priority to retain old source identifier as NEW_NA, then record count of records that have moved from OLD_NA to NEW_NA may be taken into consideration and/or the one with a greater record count may be considered.

Figure 4D:
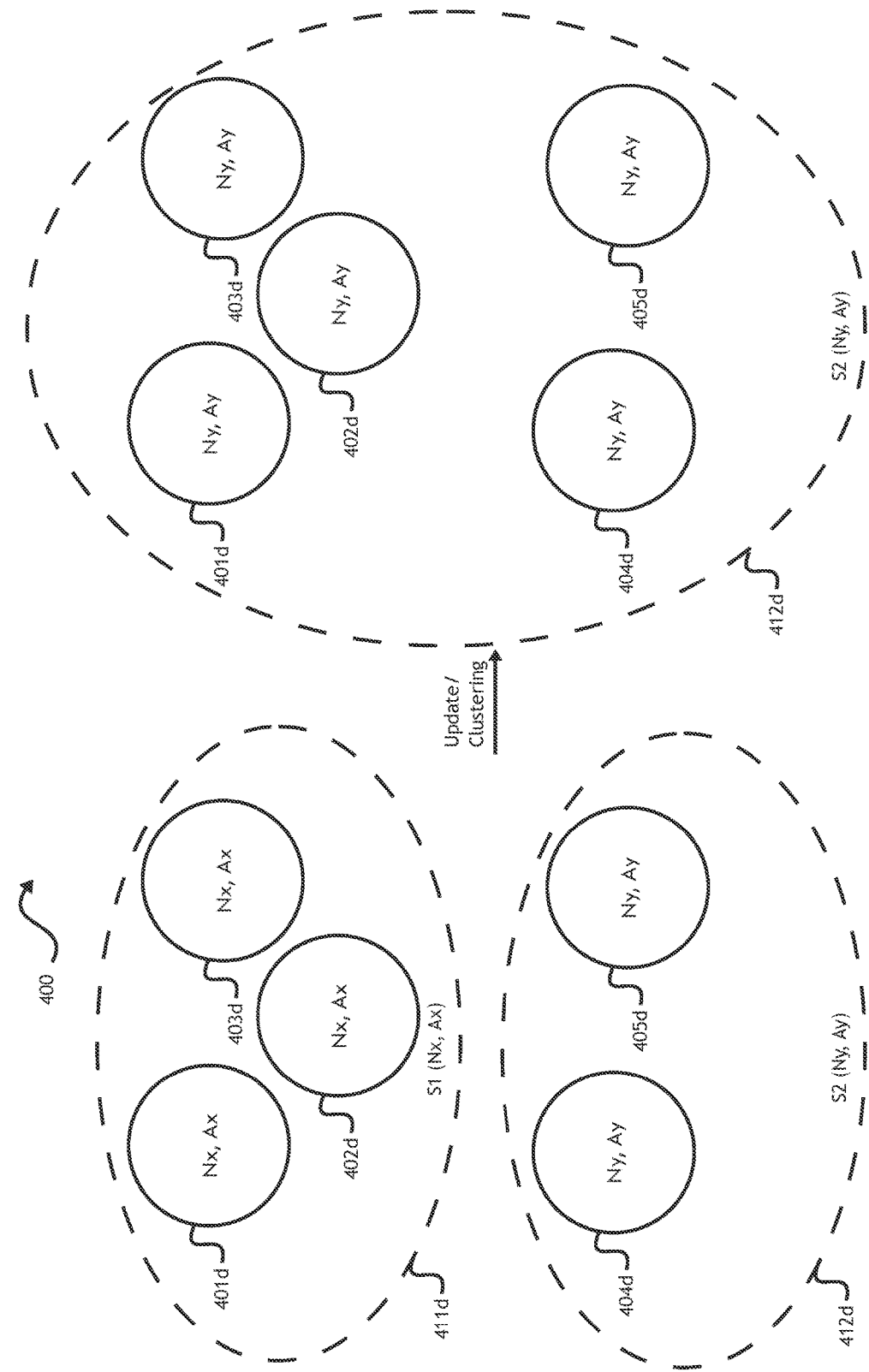

As shown in FIG. 4D, implementation 400 may include a plurality of records (e.g., transaction records, such as payment transaction records), including first record 401d, second record 402d, third record 403d, fourth record 404d, fifth record 405d, and/or the like. Additionally or alternatively, first record 401d, second record 402d, and third record 403d each may have identification information including name Nx and address Ax, and fourth record 404d and fifth record 405d may each have identification information including name Ny and address Ay. Additionally or alternatively, first record 401d, second record 402d, and third record 403d each may be initially clustered into first cluster 411d (which may be associated with first source identifier S1, name Nx, and/or address Ax), and fourth record 404d and fifth record 405d each may be initially clustered into second cluster 412d (which may be associated with second source identifier S2, name Ny, and/or address Ay). Additionally or alternatively, each of first record 401d, second record 402d, and third record 403d may be transacting records, and at least one of fourth record 404d and/or fifth record 405d may be a transacting record.

In some non-limiting embodiments or aspects, after receiving update data (e.g., at transaction service provider system 102, as described herein) and sorting the records into new clusters (e.g., by transaction service provider system 102, as described herein), each of each of first record 401d, second record 402d, and third record 403d may move to second cluster 412d (e.g., because update data causes identification data for each of first record 401d, second record 402d, and third record 403d to update/change to name Ny and address Ay). Additionally or alternatively, second cluster 412d may retain source identifier S2 (e.g., based on a determination by transaction service provider system 102 applying rules, as described herein).

Figure 4E:
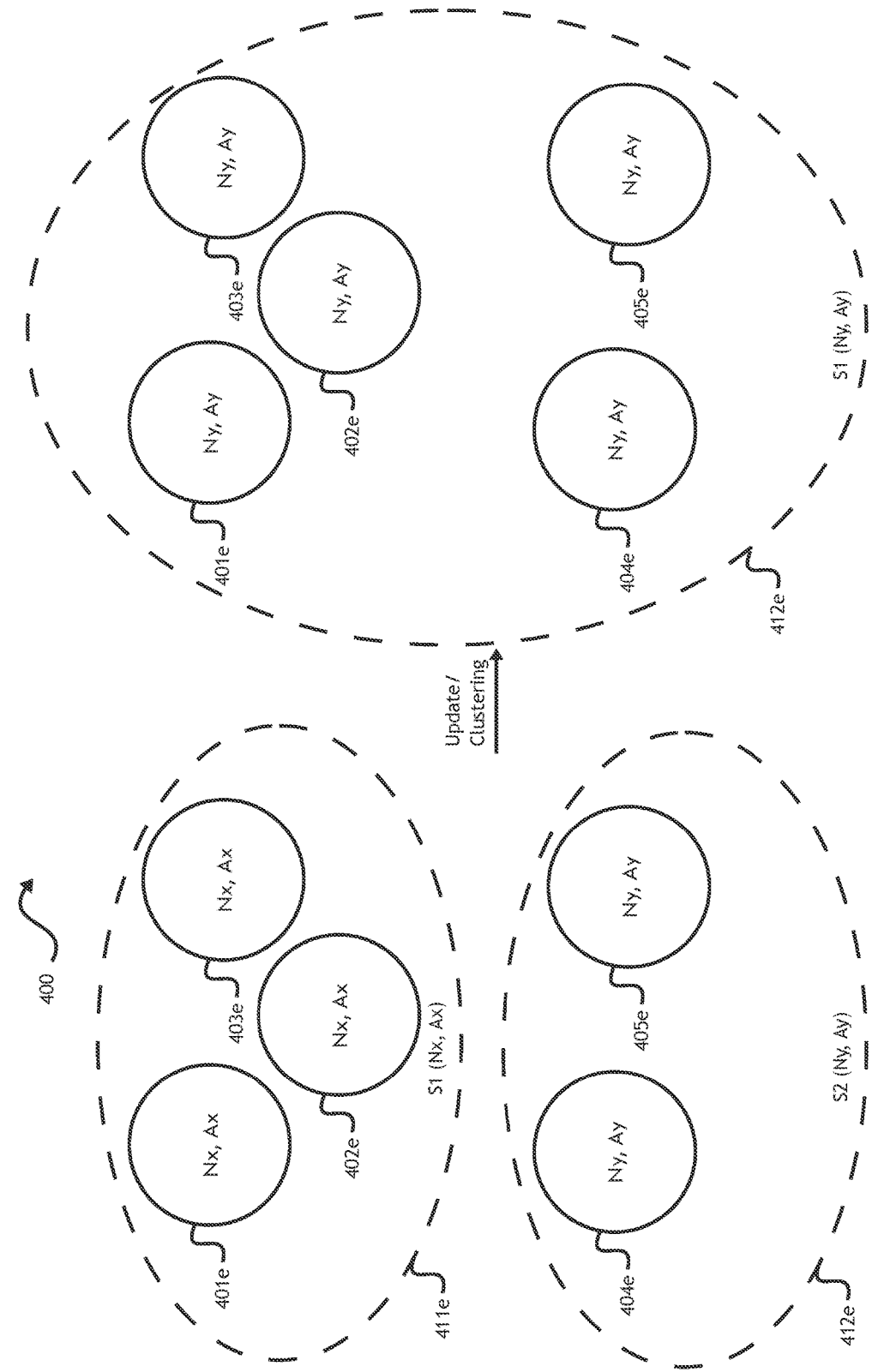

As shown in FIG. 4E, implementation 400 may include a plurality of records (e.g., transaction records, such as payment transaction records), including first record 401e, second record 402e, third record 403e, fourth record 404e, fifth record 405e, and/or the like. Additionally or alternatively, first record 401e, second record 402e, and third record 403e each may have identification information including name Nx and address Ax, and fourth record 404e and fifth record 405e may each have identification information including name Ny and address Ay. Additionally or alternatively, first record 401e, second record 402e, and third record 403e each may be initially clustered into first cluster 411e (which may be associated with first source identifier S1, name Nx, and/or address Ax), and fourth record 404e and fifth record 405e each may be initially clustered into second cluster 412e (which may be associated with second source identifier S2, name Ny, and/or address Ay). Additionally or alternatively, at least one of first record 401e, second record 402e, and/or third record 403e may be a transacting record, and fourth record 404d and fifth record 405d each may be non-transacting records.

In some non-limiting embodiments or aspects, after receiving update data (e.g., at transaction service provider system 102, as described herein) and sorting the records into new clusters (e.g., by transaction service provider system 102, as described herein), each of first record 401e, second record 402e, and third record 403e may move to second cluster 412e (e.g., because update data causes identification data for each of first record 401e, second record 402e, and third record 403e to update/change to name Ny and address Ay). Additionally or alternatively, second cluster 412e may now be associated with source identifier S1 (e.g., based on a determination by transaction service provider system 102 applying rules, as described herein).

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A method for managing source identifiers of transaction records, comprising:
receiving, with at least one processor, a plurality of transaction records, each respective transaction record of the plurality of transaction records comprising identification data associated with a source of the respective transaction record, the source for each respective transaction record of the plurality of transaction records comprising a respective merchant, the identification data for each respective transaction record of the plurality of transaction records comprising a respective name and address key pair associated with the respective merchant;
sorting, with the at least one processor, the plurality of transaction records into a first plurality of clusters based on the identification data, each cluster of the first plurality of clusters including at least one transaction record of the plurality of transaction records;
generating, with the at least one processor, a first source identifier for each respective cluster of the first plurality of clusters based on the respective name and address key pair of respective transaction records of the plurality of transaction records sorted into the respective cluster;
receiving, with the at least one processor, update data associated with an update to the plurality of transaction records;
sorting, with the at least one processor, at least some of the plurality of transaction records into a second plurality of clusters based on the identification data and the update data, wherein a first new cluster of the second plurality of clusters has first new identification data different from the identification data associated with an existing cluster of the first plurality of clusters and a second new cluster of the second plurality of clusters has second new identification data that substantially matches the identification data associated with the existing cluster of the first plurality of clusters, wherein substantially matching comprises at least one of exactly matching, matching within a predetermined tolerance, matching based on fuzzy matching, or matching closely enough to have been sorted into a same cluster; and
determining, with the at least one processor, to assign the first source identifier of the existing cluster of the first plurality of clusters to the second new cluster of the second plurality of clusters based on at least one of a number of transacting records of the existing cluster, a number of non-transacting records of the existing cluster, a number of transacting records of the first new cluster, a number of non-transacting records of the first new cluster, a number of transacting records of the second new cluster, or a number of non-transacting records of the second new cluster.

2. The method of claim 1, wherein the update data comprises at least one of a modification of the identification data of at least some transaction records of the plurality of transaction records or additional transaction records to be added to the plurality of transaction records.

3. The method of claim 1, further comprising generating, with the at least one processer, a second source identifier for the first new cluster of the second plurality of clusters.

4. The method of claim 1, wherein determining to assign the first source identifier of the existing cluster of the first plurality of clusters to the second new cluster of the second plurality of clusters is further based on at least one of a total number of records in the first new cluster of the second plurality of clusters, an aggregate of records of the existing cluster of the first plurality of clusters that were sorted into the first new cluster of the second plurality of clusters, an aggregate of records in a third cluster of the first plurality of clusters having identification data that substantially matches the first new cluster of the second plurality of clusters, an aggregate of records in the first new cluster of the second plurality of clusters that are not associated with any cluster of the first plurality of clusters, a total number of records in the second new cluster of the second plurality of clusters, an aggregate of records of the existing cluster of the first plurality of clusters that were sorted into the second new cluster of the second plurality of clusters, or an aggregate of records in the existing cluster of the first plurality of clusters.

5. The method of claim 1, wherein determining to assign the first source identifier of the existing cluster of the first plurality of clusters to the second new cluster of the second plurality of clusters comprises:
  if the number of transacting records and the number of non-transacting records of the existing cluster of the first plurality of clusters is greater than 0, and the number of transacting records and the number of non-transacting records of the second new cluster of the second plurality of clusters is greater than 0, assigning the first source identifier of the existing cluster of the first plurality of clusters to the second new cluster of the second plurality of clusters;
  if the number of transacting records and the number of non-transacting records of the existing cluster of the first plurality of clusters is greater than 0, the number of transacting records of the first new cluster of the second plurality of clusters is 0, and the number of non-transacting records of the first new cluster of the second plurality of clusters is greater than 0, assigning the first source identifier of the existing cluster of the first plurality of clusters to the second new cluster of the second plurality of clusters; and
  if a number of transacting records of a third cluster of the first plurality of clusters is greater than 0, and the identification data of the first new cluster of the second plurality of clusters substantially matches the third cluster of the first plurality of clusters, assigning the first source identifier of the existing cluster of the first plurality of clusters to the second new cluster of the second plurality of clusters.

6. A system for managing source identifiers of transaction records, comprising:
  at least one processor; and
  at least one non-transitory computer-readable medium comprising instructions to direct the at least one processor to:
    receive a plurality of transaction records, each respective transaction record of the plurality of transaction records comprising identification data associated with a source of the respective transaction record, the source for each respective transaction record of the plurality of transaction records comprising a respective merchant, the identification data for each respective transaction record of the plurality of transaction records comprising a respective name and address key pair associated with the respective merchant;
    sort the plurality of transaction records into a first plurality of clusters based on the identification data, each cluster of the first plurality of clusters including at least one transaction record of the plurality of transaction records;
    generate a first source identifier for each respective cluster of the first plurality of clusters based on the respective name and address key pair of respective transaction records of the plurality of transaction records sorted into the respective cluster;
    receive update data associated with an update to the plurality of transaction records;
    sort at least some of the plurality of transaction records into a second plurality of clusters based on the identification data and the update data, wherein a first new cluster of the second plurality of clusters has first new identification data different from the identification data associated with an existing cluster of the first plurality of clusters and a second new cluster of the second plurality of clusters has second new identification data that substantially matches identification data associated with the existing cluster of the first plurality of clusters, wherein substantially matching comprises at least one of exactly matching, matching within a predetermined tolerance, matching based on fuzzy matching, or matching closely enough to have been sorted into a same cluster; and
    determine to assign the first source identifier of the existing cluster of the first plurality of clusters to the second new cluster of the second plurality of clusters based on at least one of a number of transacting records of the existing cluster, a number of non-transacting records of the existing cluster, a number of transacting records of the first new cluster, a number of non-transacting records of the first new cluster, a number of transacting records of the second new cluster, or a number of non-transacting records of the second new cluster.

7. The system of claim 6, wherein the update data comprises at least one of a modification of the identification data of at least some transaction records of the plurality of transaction records or additional transaction records to be added to the plurality of transaction records.

8. The system of claim 6, wherein the instructions further direct the at least one processor to generate a second source identifier for the first new cluster of the second plurality of clusters.

9. The system of claim 6, wherein determining to assign the first source identifier of the existing cluster of the first plurality of clusters to the second new cluster of the second plurality of clusters is further based on at least one of a total number of records in the first new cluster of the second plurality of clusters, an aggregate of records of the existing cluster of the first plurality of clusters that were sorted into the first new cluster of the second plurality of clusters, an aggregate of records in a third cluster of the first plurality of clusters having identification data that substantially matches the first new cluster of the second plurality of clusters, an aggregate of records in the first new cluster of the second plurality of clusters that are not associated with any cluster of the first plurality of clusters, a total number of records in the second new cluster of the second plurality of clusters, an aggregate of records of the existing cluster of the first plurality of clusters that were sorted into the second new cluster of the second plurality of clusters, or an aggregate of records in the existing cluster of the first plurality of clusters.

10. The system of claim 6, wherein determining to assign the first source identifier of the existing cluster of the first plurality of clusters to the second new cluster of the second plurality of clusters comprises:
  if the number of transacting records and the number of non-transacting records of the existing cluster of the first plurality of clusters is greater than 0, and the number of transacting records and the number of non-transacting records of the second new cluster of the second plurality of clusters is greater than 0, assigning the first source identifier of the existing cluster of the first plurality of clusters to the second new cluster of the second plurality of clusters;

if the number of transacting records and the number of non-transacting records of the existing cluster of the first plurality of clusters is greater than 0, the number of transacting records of the first new cluster of the second plurality of clusters is 0, and the number of non-transacting records of the first new cluster of the second plurality of clusters is greater than 0, assigning the first source identifier of the existing cluster of the first plurality of clusters to the second new cluster of the second plurality of clusters; and if a number of transacting records of a third cluster of the first plurality of clusters is greater than 0, and the identification data of the first new cluster of the second plurality of clusters substantially matches the third cluster of the first plurality of clusters, assigning the first source identifier of the existing cluster of the first plurality of clusters to the second new cluster of the second plurality of clusters.

11. A computer program product for managing source identifiers of transaction records, the computer program product comprising at least one non-transitory computer-readable medium including one or more instructions that, when executed by at least one processor, cause the at least one processor to:

receive a plurality of transaction records, each respective transaction record of the plurality of transaction records comprising identification data associated with a source of the respective transaction record, the source for each respective transaction record of the plurality of transaction records comprising a respective merchant, the identification data for each respective transaction record of the plurality of transaction records comprising a respective name and address key pair associated with the respective merchant;

sort the plurality of transaction records into a first plurality of clusters based on the identification data, each cluster of the first plurality of clusters including at least one transaction record of the plurality of transaction records;

generate a first source identifier for each respective cluster of the first plurality of clusters based on the respective name and address key pair of respective transaction records of the plurality of transaction records sorted into the respective cluster;

receive update data associated with an update to the plurality of transaction records;

sort at least some of the plurality of transaction records into a second plurality of clusters based on the identification data and the update data, wherein a first new cluster of the second plurality of clusters has first new identification data different from the identification data associated with an existing cluster of the first plurality of clusters and a second new cluster of the second plurality of clusters has second new identification data that substantially matches the identification data associated with the existing cluster of the first plurality of clusters, wherein substantially matching comprises at least one of exactly matching, matching within a predetermined tolerance, matching based on fuzzy matching, or matching closely enough to have been sorted into a same cluster; and determine to assign the first source identifier of the existing cluster of the first plurality of clusters to the second new cluster of the second plurality of clusters based on at least one of a number of transacting records of the existing cluster, a number of non-transacting records of the existing cluster, a number of transacting records of the first new cluster, a number of non-transacting records of the first new cluster, a number of transacting records of the second new cluster, or a number of non-transacting records of the second new cluster.

12. The computer program product of claim 11, wherein the update data comprises at least one of a modification of the identification data of at least some transaction records of the plurality of transaction records or additional transaction records to be added to the plurality of transaction records.

13. The computer program product of claim 11, wherein the instructions further direct the at least one processor to generate a second source identifier for the first new cluster of the second plurality of clusters.

14. The computer program product of claim 11, wherein determining to assign the first source identifier of the existing cluster of the first plurality of clusters to the second new cluster of the second plurality of clusters is further based on at least one of a total number of records in the first new cluster of the second plurality of clusters, an aggregate of records of the existing cluster of the first plurality of clusters that were sorted into the first new cluster of the second plurality of clusters, an aggregate of records in a third cluster of the first plurality of clusters having identification data that substantially matches the first new cluster of the second plurality of clusters, an aggregate of records in the first new cluster of the second plurality of clusters that are not associated with any cluster of the first plurality of clusters, a total number of records in the second new cluster of the second plurality of clusters, an aggregate of records of the existing cluster of the first plurality of clusters that were sorted into the second new cluster of the second plurality of clusters, or an aggregate of records in the existing cluster of the first plurality of clusters.

15. The computer program product of claim 11, wherein determining to assign the first source identifier of the existing cluster of the first plurality of clusters to the second new cluster of the second plurality of clusters comprises:

if the number of transacting records and the number of non-transacting records of the existing cluster of the first plurality of clusters is greater than 0, and the number of transacting records and the number of non-transacting records of the second new cluster of the second plurality of clusters is greater than 0, assigning the first source identifier of the existing cluster of the first plurality of clusters to the second new cluster of the second plurality of clusters;

if the number of transacting records and the number of non-transacting records of the existing cluster of the first plurality of clusters is greater than 0, the number of transacting records of the first new cluster of the second plurality of clusters is 0, and the number of non-transacting records of the first new cluster of the second plurality of clusters is greater than 0, assigning the first source identifier of the existing cluster of the first plurality of clusters to the second new cluster of the second plurality of clusters; and if a number of transacting records of a third cluster of the first plurality of clusters is greater than 0, and the identification data of the first new cluster of the second plurality of clusters substantially matches the third cluster of the first plurality of clusters, assigning the first source identifier of the existing cluster of the first plurality of clusters to the second new cluster of the second plurality of clusters.

\* \* \* \* \*